(12) United States Patent
Chaplik

(10) Patent No.: US 6,804,348 B1
(45) Date of Patent: Oct. 12, 2004

(54) CIRCUIT FOR ECHO-CANCELLATION IN AN ASYMMETRIC, TWO-WAY TIME-AND FREQUENCY-SHARED COMMUNICATION MEDIUM

(75) Inventor: Naom Chaplik, San Diego, CA (US)

(73) Assignee: Viadux, Inc., San Diego, CA (US)

( * ) Notice: Subject to any disclaimer, the term of this patent is extended or adjusted under 35 U.S.C. 154(b) by 588 days.

(21) Appl. No.: 09/708,771

(22) Filed: Nov. 8, 2000
(Under 37 CFR 1.47)

(51) Int. Cl.[7] .......................... H04M 1/00; H04M 9/00; H04M 11/00; H04M 9/08
(52) U.S. Cl. .............................. 379/399.01; 379/93.01; 379/93.06; 379/93.08; 379/100.17; 379/406.12
(58) Field of Search ........................... 379/90.01, 93.01, 379/93.05, 93.06, 93.08, 100.17, 343, 344, 345, 406.01, 406.06, 406.12, 387.01, 387.02, 388.07, 390.04, 394, 398, 399.01, 402, 413.02

(56) References Cited

U.S. PATENT DOCUMENTS

| | | | | |
|---|---|---|---|---|
| 4,481,622 A | * | 11/1984 | Cheng et al. ............... | 370/286 |
| 4,621,356 A | * | 11/1986 | Scipione ................... | 379/93.08 |
| 4,811,342 A | * | 3/1989 | Huang ........................ | 370/292 |
| 4,856,058 A | * | 8/1989 | Sato et al. .................. | 379/394 |
| 5,764,755 A | * | 6/1998 | Chen ..................... | 379/413.01 |
| 6,377,683 B1 | * | 4/2002 | Dobson et al. ........ | 379/406.12 |
| 6,393,110 B1 | * | 5/2002 | Price ....................... | 379/93.01 |

* cited by examiner

Primary Examiner—Binh Tieu
(74) Attorney, Agent, or Firm—Gray Cary Ware & Freidenrich, LLP

(57) ABSTRACT

A hybrid circuit models a plurality of attributes of a communication system including a subscriber line coupled to a line interface circuit. The plurality of attributes includes subscriber line impedance, and impedance of a coupling transformer. The attributes are based on other factors, such as whether or not bridge taps exist at or near the line interface circuit on the subscriber line. The plurality of attributes are modeled by a specific arrangement of resistive and capacitive elements to substantially duplicate the collective transforming effects of the attributes on a transmission signal being sent out on the subscriber line. The transmission signal is transformed and provided to an output, where it is subtracted from a composite signal representing a combination of the actual transformed transmission signal and a receive signal. The subtraction yields an isolated receive signal, which is later processed to recover the full receive signal.

10 Claims, 3 Drawing Sheets

CIRCUIT FOR ECHO-CANCELLATION IN AN ASYMMETRIC, TWO-WAY TIME-AND FREQUENCY-SHARED COMMUNICATION MEDIUM

BACKGROUND OF THE INVENTION

1. Field of the Invention

The present invention relates generally to data communications, and more particularly to a circuit for matching a digital transmission on a subscriber line, where the matched transmission is used for echo-cancellation.

2. Description of the Related Art

FIG. 1 shows a communication system 10 which includes a subscriber line interface circuit 100 coupled to one end of a subscriber line 110. The subscriber line 110 is a communication medium for carrying voice and/or data signals. One example of a subscriber line 110 is a conventional telephone line comprised of a twisted-pair of copper wires. The subscriber line 110 includes a tip line 112 and a ring line 114. According to one configuration for which the present invention is suited, the subscriber line 110 is a two-way communication medium, whereby the tip and ring lines 112 and 114 together carry both signals being transmitted and signals being received. The transmission signals and receive signals overlap each other in both time and frequency domains on the communication medium. In effect, the communication medium carries a composite signal representing overlapping transmission and receive signals.

The line interface 100 includes a transmission path 122 and a receive path 124, each of which having lines corresponding to the tip line 112 and the ring line 114. The line interface 100 is coupled to the subscriber line 110, typically by a coupling transformer 115. A driver 120 drives transmission signals onto the subscriber line 110. The driver is preferably a low-impedance driver. A pair of isolation resistors $R_T$ and $R_L$ are resistively matched as close as possible to an impedance $Z_{SL}$ of the subscriber line at the transformer 115. The impedance $Z_{SL}$ is based on an impedance of the subscriber line $Z_{LOOP}$ as it is converted through the transformer 115, as seen through the turn ratio of the coils of the transformer 115. Secondarily, $Z_{SL}$ is also based on other attributes, such as capacitance, for example, of the transformer 115 and other potential circuit components of the line interface 100, which are not shown in FIG. 1.

Point A in FIG. 1 represents a point between the output of the driver 120 and the isolation resistors, $R_T$ and $R_L$. The driver 120 has a very low output impedance, approaching zero, so that transmission signals on the output of the driver 120 are not affected by signals being received. Thus, signals on the driver 120 side of isolation resistors $R_T$ and $R_L$ are largely, if not exclusively, transmission signals. On the subscriber line side of the terminal resistors $R_T$ and $R_L$, several attributes of the communication system 10 transform the transmission signals. The attributes include an impedance of the subscriber line 110 and an impedance of the coupling transformer 115 At that point, the transmission signals are also combined with, and affecting, the signals being received. Point B in FIG. 1 represents a point on the subscriber line interface circuit where transformed transmission signals are combined with receive signals.

As both receive and transmit signals are present on the subscriber line, and have overlapping spectral content, signals being received must be isolated from transmission signals at the receiving end, i.e. at the line interface circuit 100. However, such a procedure is very complex, due to the difficulty of determining the signal being transmitted and its effect on the signal being received. This difficulty exists because the transmission signals are transformed from a known signal at the point where they are output from the driver 120, to a transformed signal at the point where they reach a transformer coupled to the subscriber line 110, influenced by a plurality of transforming attributes. Most of the transformation is related to the attributes of the communication system 10 described above.

Signals arriving at the line interface 100 have attenuated extensively, and thus make up a smaller relative portion of the combined signal present on the subscriber line 110. Therefore, some line interfaces employ a device known as a hybrid circuit 130 to approximate the transformation of the transmission signals. The hybrid circuit 130 is configured to produce a simulated transformed transmission signal in order to remove any transformed transmission signals from the receive signals.

Operation of the line interface 100 shown in FIG. 1 occurs as follows. The hybrid circuit 130 receives a pure transmission signal from the driver, and transforms it based on approximated characteristics of the subscriber line at the line interface 100. A transformed transmission signal, representing a transmission signal that would occur at a point where it is combined with a receive signal, is passed to a subtractor 150. A composite signal, having both transmission signals and receive signals, is coupled and filtered by a filter 140, to remove aliasing or interfering frequencies. At the subtractor 150, the signal provided by the hybrid circuit 130 is subtracted from the composite signal provided by the filter 140, to theoretically yield only a receive signal. The recovered receive signal is then passed on for digital signal processing. The anti-aliasing filter 140 is normally provided separately from the hybrid circuit 130 to ensure a receive signal does not exhibit aliasing when the digitization process occurs in the DSP.

Conventional hybrid circuits, therefore, generally take a "known" signal being transmitted, and approximate how that signal will change in the presence of signal-transforming attributes or characteristics of the subscriber line. An approximated transmission signal is needed so that it may be removed from a receive signal. Accordingly, a hybrid circuit should model the transforming characteristics of the subscriber line on a transmission signal as accurately as possible. Conventional hybrid circuits are limited in how well they model those transforming characteristics of a given subscriber line.

SUMMARY OF THE INVENTION

The present invention is a circuit and method for modeling a plurality of attributes of a communication system that includes a line interface coupled to a subscriber line. The plurality of attributes collectively transform a transmission signal prior, and in some cases as it is being combined with a receive signal on the subscriber line. The attributes include impedances from various sources on the subscriber line and circuits of a line interface circuit. The present invention accurately models the plurality of attributes in order to substantially duplicate the transforming effects of the attributes on a representation of a transmission signal that has not yet been transformed, and provide a transformed transmission signal for removal from the receive signal.

In an embodiment of the invention, a circuit includes an input for providing a representation of an outbound transmission signal that is substantially free of time and frequency overlaps with inbound receive signals from the subscriber line, and wherein transmission signal bandwidth is asymmetrical to receive signal bandwidth. The circuit further includes a modeling section connected to the input, comprising resistive and a capacitive elements which are arranged for modeling a plurality of attributes of a subscriber line environment which transform transmission signals prior to overlapping with receive signals. The modeling section is further configured to substantially duplicate a transformation on the representation of the transmission signal. An output connected to the modeling section provides the transformed representation of the transmission signal.

In another embodiment of the invention, a method includes the steps of coupling an outbound transmission prior to its overlap with an inbound receive signal, to provide a representation of the transmission signal, modeling a plurality of attributes of the communication system, the attributes having a collective transforming effect on outbound transmission signals prior to overlapping with receive signals, and with the modeling, transforming the representation of the outbound transmission signal.

DETAILED DESCRIPTION OF THE PREFERRED EMBODIMENTS

The present invention is an improved hybrid circuit and method of operation of the same, where a plurality of attributes of the subscriber line are modeled by an arrangement of resistors and capacitors. The arrangement models the attributes from a point where the transmission signal is provided to the subscriber line, to a point where the transmission signal is combined with a receive signal. The arrangement thus substantially duplicates the transforming effects of the attributes on a transmission signal provided on the subscriber line. The modeled attributes are then applied to a coupled transmission signal as it is being transmitted onto a full-duplex subscriber line. The hybrid circuit according to the present invention provides a transformed transmission signal which may be removed from a receive signal, to recover a clean receive signal.

Figure 1:
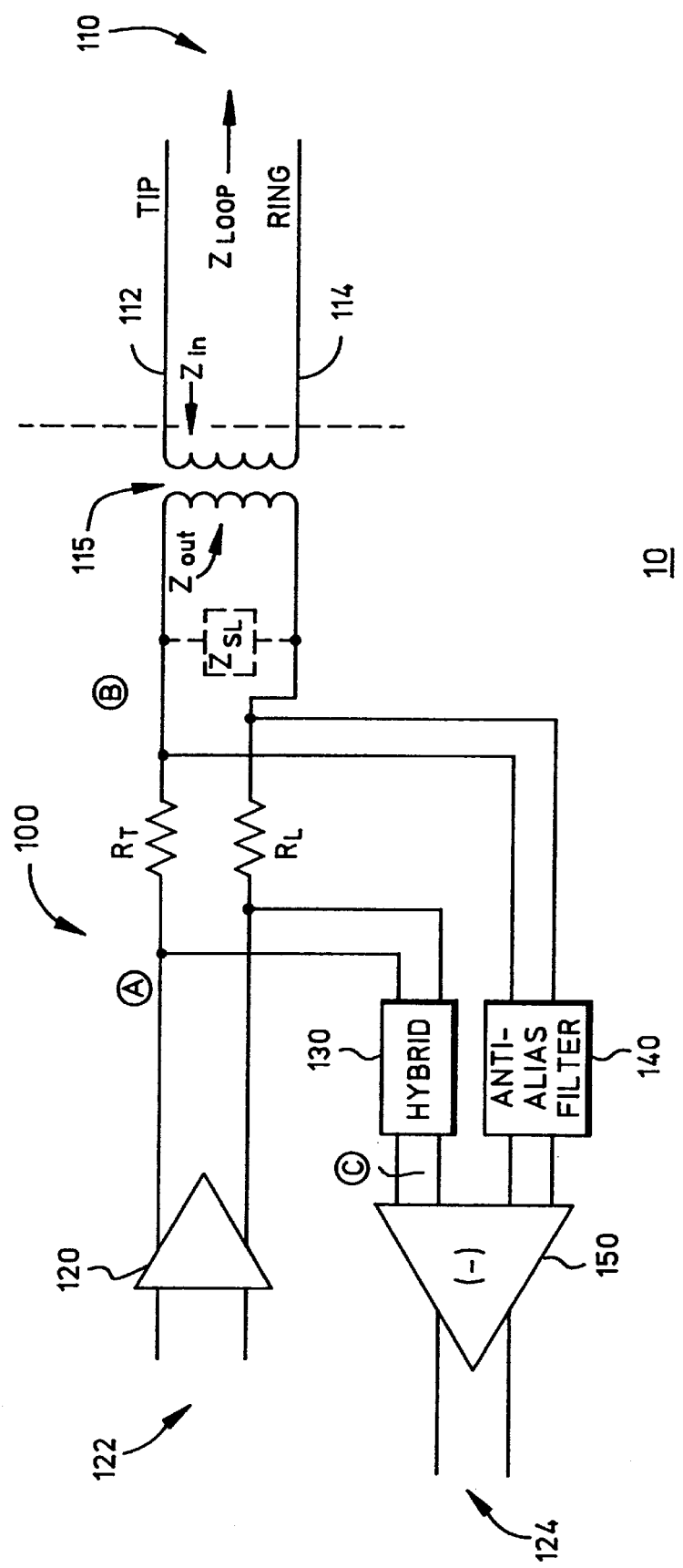
FIG. 1 shows a line interface for an asymmetric digital subscriber line (ADSL) to illustrate the function of a hybrid circuit.

Generally, the hybrid circuit 130 and its method of operation, according to the invention, accurately replicates a transfer function of a transmission signal between points A and C in FIG. 1, such that it matches a transfer function of the transmission signal between points A and B.

Figure 2:
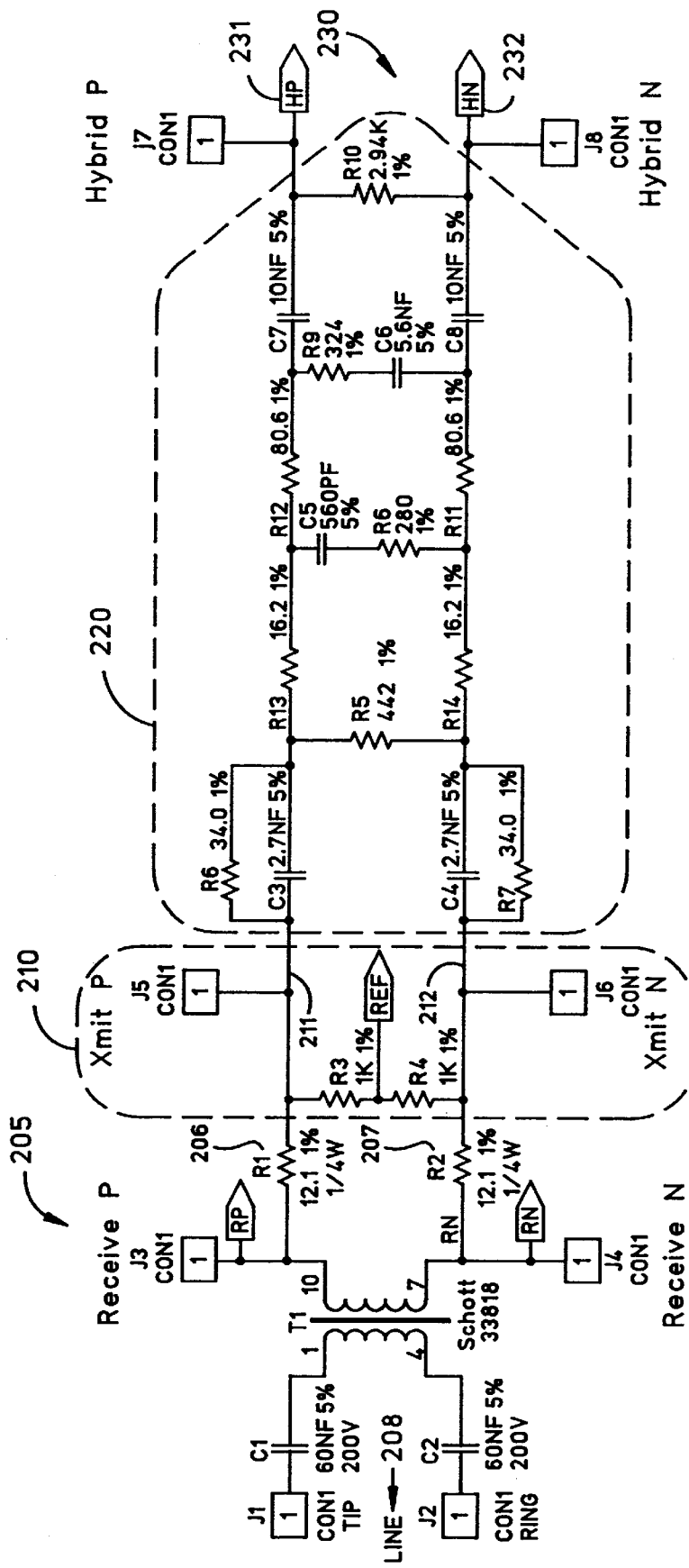
FIG. 2 is a circuit schematic diagram of an improved hybrid circuit according to one preferred embodiment of the present invention.

FIG. 2 is a circuit diagram of a hybrid circuit 200 according to an exemplary embodiment of the invention. According to FIG. 2, and with reference to the communication system 10 shown in FIG. 1, the hybrid circuit 200 is shown for a subscriber line 110 that has no bridge taps near the line interface 100. The subscriber line illustrated in FIG. 2 includes a transmission line as a differential pair of lines Xmit P and Xmit N, where Xmit P can carry a positive signal and Xmit N can carry a negative signal of the outbound transmissions on the differential transmission line. The hybrid circuit includes an input 210 that couples an outbound transmission signal from transmission lines Xmit P and Xmit N. Input 210 includes a first line 211 and a second line 212, corresponding to the transmission lines Xmit P and Xmit N respectively. In an alternative embodiment, however, the input 210 may be a single-ended connection to the subscriber line 110, which may or may not be carrying a differential pair of signals.

Input 210 thus provides a representation of the outbound transmission signal at a point where the outbound transmission signal is substantially free of time and frequency overlaps with input receive signals from the subscriber line 208, which overlapping exists, for example, at points labeled as Receive P and Receive N in FIG. 2. A DC reference signal REF is extracted at the input 210, and restored later after the outbound transmission signal representation has been processed in the hybrid circuit 200.

The hybrid circuit 200 further includes a modeling section 220 that is connected to the input 210 for receiving the representation of the outbound transmission signal. The modeling section 220 is configured to model and duplicate the transforming effects of attributes of the subscriber line. The modeling section 220 includes a plurality of resistive elements and a plurality of capacitive elements, specifically arranged so as to model the attributes of the subscriber line environment which transform the transmission signal as it overlaps with receive signals.

In an embodiment, the arrangement of resistive and capacitive elements receive the positive and negative signals of a differential pair representing the outbound transmission, and transform the transmission signal so as to represent the transformed transmission signal as it would exist when overlapped with receive signals on the subscriber line 205. An output 230 includes a first line 231 and a second line 232, and is coupled to the modeling section for providing the transformed representation of the transmission signal.

In accordance with an exemplary embodiment of the invention, the modeling section 220 of hybrid circuit 200 includes a first combination of a resistor R6 connected in parallel with a capacitor C3, wherein the first combination is connected to the first input line 211, and a second combination of a resistor R7 connected in parallel with a capacitor C4, wherein the second combination is connected to the second input line 212. The matching section 220 further includes a third combination of a resistor R13, a resistor R12 and a capacitor C7, connected in series, wherein the resistor R13 is connected to the first combination and the capacitor C7 is connected to the first output line 231, and a fourth combination of a resistor R14, a resistor R11, and a capacitor C8, connected in series, wherein the resistor R14 is connected to the second combination and the capacitor C8 is connected to the second output line 232.

In the exemplary embodiment, the matching section 220 still further includes a resistor R5 connected to a node between the first and third combination, and to a node between the second and fourth combinations, and a fifth combination of a capacitor C5 connected in series with a resistor R8, wherein the capacitor C5 is connected to a node between the resistor R13 and the resistor R12, and wherein the resistor R8 is connected to a node between the resistor R14 and the resistor R11. A sixth combination in the exemplary matching section 220 has a resistor R9 connected in series with a capacitor C6, wherein the resistor R9 is connected to a node between the resistor R12 and the capacitor C7, and wherein the capacitor C6 is connected to a node between the resistor R11 and the capacitor C8.

Finally, the matching section 220 includes a resistor R10 connected to a node between the capacitor C7 and the first output line 231, and to a node between the capacitor C8 and the second output line 232.

In a specific embodiment, the resistors R6 and R7 are 34 Ω resistors, resistor R5 is a 442 Ω resistor, resistors R13 and R14 are 16.2 Ω resistors, and resistors R12 and R11 are 60.6 Ω resistors. In the specific embodiment, the resistor R8 is a 280 Ω resistor, the resistor R9 is a 324 Ω resistor, and the resistor R10 is a 2.94 kΩ resistor. In the embodiment, all of the resistors are 1% tolerance resistors, but may have other values of tolerance. In accordance with the specific embodiment, capacitors C3 and C4 are 2.7 nF capacitors, capacitor C5 is a 560 pF capacitor, and capacitor C6 is a 5.6 nF capacitor. Capacitors C7 and C8 are 10 nF capacitors. All of the capacitors may be 5% tolerance, however other tolerances are suitable.

Thus, the values and tolerances of the resistive and capacitive elements illustrated in FIG. 2 are not to be limited to those described herein. On the contrary, those skilled in the art will recognize that other values and tolerances may be used for capacitors and resistors which will still fall within the scope of the present invention. Therefore, the resistors and capacitors described in the specific embodiment are provided as an example only.

Figure 3:
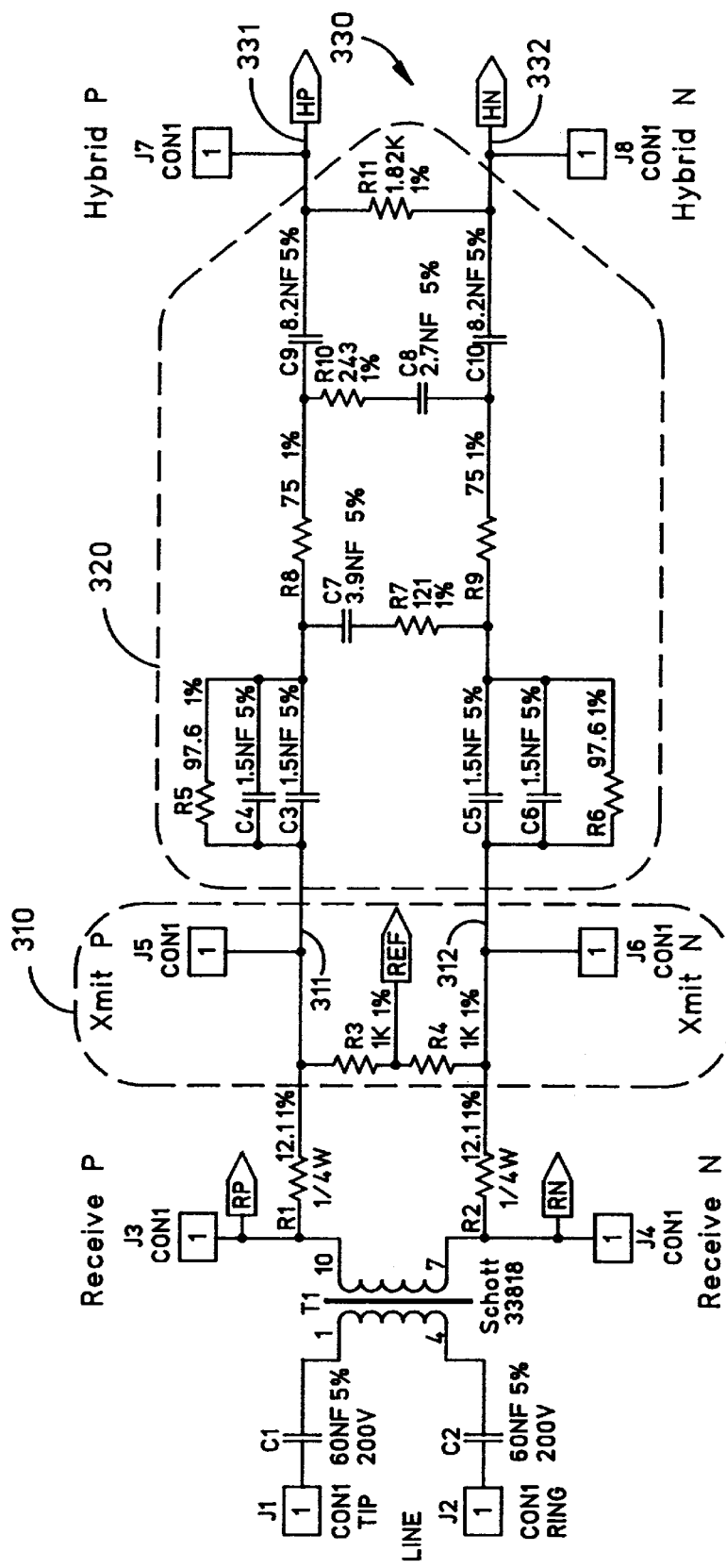
FIG. 3 is a circuit schematic diagram of an improved hybrid circuit according to a second preferred embodiment of the present invention.

FIG. 3 illustrates one alternative embodiment of a hybrid circuit 300 according to the present invention. Hybrid circuit 300 is adapted for a case where a subscriber line includes one or more taps to other subscriber lines near the line interface. The circuit 300 includes an input 310 having a first line 311 and a second line 312, which are preferably arranged as a differential pair of wires, but which may be a single-ended input connection to a differential subscriber line 110 shown in FIG. 1. The input 310 corresponds to the tip and ring lines of the subscriber line 110.

The hybrid circuit 300 includes a modeling section 320 having a plurality of resistive elements and a plurality of capacitive elements, and which is configured to model subscriber line attributes as discussed above in reference to modeling section 220 of FIG. 2. An output 330 is connected to the modeling section and may also be a differential pair of wires. The output 330 includes a first line 331 and a second line 332.

In accordance with the alternative embodiment and with reference to FIG. 3, the modeling section 320 includes a first combination of a resistor R5, a capacitor C3, and a capacitor C4, connected in parallel, and wherein the first combination is connected to the first input line 311, and a second combination of a resistor R6, a capacitor C5, and a capacitor C6, all of which are connected in parallel, and wherein the second combination is connected to the second input line 312. The modeling section further includes a third combination of a resistor R8 and a capacitor C9, connected in series, wherein the resistor R8 is connected to the first combination and the capacitor C9 is connected to the first output line 331, and a fourth combination of a resistor R9 and a capacitor C10, connected in series, wherein the resistor R9 is connected to the second combination and the capacitor C10 is connected to the second output line 332.

Additionally, the modeling section 320 includes a fifth combination and a sixth combination. The fifth combination includes a capacitor C7 and a resistor R7 connected in series, wherein the capacitor C7 is connected to a node between the first combination and the resistor R8, and wherein the resistor R7 is connected to a node between the second combination and the resistor R9. The sixth combination includes a resistor R10 and a capacitor C8 connected in series, wherein the resistor R10 is connected to a node between the resistor R8 and the capacitor C9, and wherein the capacitor C8 is connected to a node between the resistor R9 and the capacitor C10. Finally, a resistor R11 is connected to a node between the capacitor C9 and the first output line 331, and to a node between the capacitor C10 and the second output line 332.

In a specific embodiment of the alternative arrangement for the modeling section, resistors R5 and R6 are 97.6 Ω resistors, resistors R8 and R9 are 75 Ω resistors, resistor R7 is a 121 Ω resistor, resistor R10 is a 243 Ω resistor, and resistor R11 is a 1.82 kΩ resistors. According to this embodiment, each of the ohmic values for the resistors have a tolerance of 1%.

In the specific embodiment, capacitors C3, C4, C5, and C6 are 1.5 nF capacitors. Capacitors C9 and C10 are 8.2 nF capacitors, capacitor C7 is a 3.9 nF capacitor, and capacitor C8 is a 2.7 nF capacitor. In this embodiment, all capacitors are have a 5% tolerance.

In accordance with the invention, the specific arrangement of capacitors and resistors, and their values, shall not limit the scope of the invention. Other arrangements and values are possible, as well as tolerances, such that a hybrid circuit may still fall within the teachings of the present invention. Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A circuit for representing a digital transmission on a two-way subscriber line carrying overlapping transmission and receive signals in time and frequency domains, the circuit comprising:

an input for providing a representation of an outbound transmission signal that is substantially free of time and frequency overlaps with inbound receive signals from the subscriber line, and wherein transmission signal bandwidth is asymmetrical to receive signal bandwidth;

a modeling section connected to the input, comprising a plurality of resistive elements and a plurality of capacitive elements, the resistive and capacitive elements being arranged for modeling a plurality of attributes of a subscriber line environment which transform transmission signals as they overlap with receive signals, the modeling section further being configured to substantially duplicate a transformation on the representation of the transmission signal; and an output connected to the modeling section for providing the transformed representation of the transmission signal.

2. The circuit according to claim 1, wherein the attributes include an impedance of the subscriber line and an impedance of the line interface.

3. The circuit according to claim 1, wherein the input includes a first line and a second line, and wherein the output includes a first line and a second line.

4. The circuit according to claim 3, wherein the resistive and capacitive elements of the modeling section include:

a first combination of a resistor R6 connected in parallel with a capacitor C3, wherein the first combination is connected to the first input line;

a second combination of a resistor R7 connected in parallel with a capacitor C4, wherein the second combination is connected to the second input line;

a third combination of a resistor R13, a resistor R12 and a capacitor C7, connected in series, wherein the resistor R13 is connected to the first combination and the capacitor C7 is connected to the first output line;

a fourth combination of a resistor R14, a resistor R11, and a capacitor C8, connected in series, wherein the resistor R14 is connected to the second combination and the capacitor C8 is connected to the second output line;

a resistor R5 connected to a node between the first and third combination, and to a node between the second and fourth combinations;

a fifth combination of a capacitor C5 connected in series with a resistor R8, wherein the capacitor C5 is connected to a node between the resistor R13 and the resistor R12, and wherein the resistor R8 is connected to a node between the resistor R14 and the resistor R11;

a sixth combination of a resistor R9 connected in series with a capacitor C6, wherein the resistor R9 is connected to a node between the resistor R12 and the capacitor C7, and wherein the capacitor C6 is connected to a node between the resistor R11 and the capacitor C8; and a resistor R10 connected to a node between the capacitor C7 and the first output line, and to a node between the capacitor C8 and the second output line.

5. The circuit according to claim 3, wherein the resistive and capacitive elements of the modeling section include:

a first combination of a resistor R5, a capacitor C3, and a capacitor C4, connected in parallel, and wherein the first combination is connected to the first input line;

a second combination of a resistor R6, a capacitor C5, and a capacitor C6, connected in parallel, and wherein the second combination is connected to the second input line;

a third combination of a resistor R8 and a capacitor C9, connected in series, wherein the resistor R8 is connected to the first combination and the capacitor C9 is connected to the first output line;

a fourth combination of a resistor R9 and a capacitor C10, connected in series, wherein the resistor R9 is connected to the second combination and the capacitor C10 is connected to the second output line;

a fifth combination of a capacitor C7 and a resistor R7 connected in series, wherein the capacitor C7 is connected to a node between the first combination and the resistor R8, and wherein the resistor R7 is connected to a node between the second combination and the resistor R9;

a sixth combination of a resistor R10 and a capacitor C8 connected in series, wherein the resistor R10 is connected to a node between the resistor R8 and the capacitor C9, and wherein the capacitor C8 is connected to a node between the resistor R9 and the capacitor C10; and a resistor R11 connected to a node between the capacitor C9 and the first output line, and to a node between the capacitor C10 and the second output line.

6. The circuit according to claim 3, wherein the input includes a resistor R3 and a resistor R4, connected in series between the first input line and the second input line, for extracting a DC reference signal from the representation of the transmission signal.

7. In a communication system having a subscriber line interface carrying overlapping transmission and receive signals in time and frequency domains, and where transmission signal bandwidth is asymmetrical to receive signal bandwidth, a method of representing the transmission signal for removal from the receive signal, comprising:

coupling an outbound transmission prior to its overlap with an inbound receive signal, to provide a representation of the transmission signal;

modeling a plurality of attributes of the communication system using a combination of resistive elements and capacitive elements, the attributes having a collective transforming effect on outbound transmission signals prior to overlapping with receive signals; and with the modeling, transforming the representation of the outbound transmission signal.

8. The method of claim 7, wherein the plurality of attributes includes an impedance of the subscriber line at a point at the subscriber line interface where the transmission signal is combined with a signal being received.

9. The method of claim 8, wherein the plurality of attributes further includes impedance characteristics of circuit components of the line interface.

10. The method of claim 7, further comprising:

extracting a DC reference signal from the representation of the transmission signal; and restoring the DC reference signal to the representation of the transformed transmission signal.

* * * * *